United States Patent
Brumwell

(10) Patent No.: US 7,629,052 B2
(45) Date of Patent: Dec. 8, 2009

(54) PROTECTIVE COVER SYSTEM

(76) Inventor: Larry Brumwell, 1010 NW. Union St., Bend, OR (US) 97701

( * ) Notice: Subject to any disclaimer, the term of this patent is extended or adjusted under 35 U.S.C. 154(b) by 499 days.

(21) Appl. No.: 11/381,236

(22) Filed: May 2, 2006

(65) Prior Publication Data

US 2006/0262405 A1     Nov. 23, 2006

Related U.S. Application Data

(60) Provisional application No. 60/677,868, filed on May 5, 2005.

(51) Int. Cl.
  *B32B 17/06*     (2006.01)
  *B32B 43/00*     (2006.01)

(52) U.S. Cl. .................. 428/426; 428/33; 428/41.7; 428/41.8; 428/42.1; 428/42.2; 428/42.3; 428/201; 428/202; 359/577; 156/94; 156/98; 156/99; 156/106

(58) Field of Classification Search .................. None
See application file for complete search history.

(56) References Cited

U.S. PATENT DOCUMENTS 4,716,601 A  *  1/1988   McNeal .................. 2/434

OTHER PUBLICATIONS

US Invention registration H1,023—Removable lens cover for protective coveralls.

* cited by examiner

*Primary Examiner*—Ling Xu
(74) *Attorney, Agent, or Firm*—Trent H. Baker; Baker & Associates PLLC

(57) ABSTRACT

The present invention relates to a protective cover system. One embodiment of the present invention relates to a multi-layer protective cover system configured to be disposed over a transparent object. Particular embodiments relate to incorporating the system with electronic devices and articles of eyewear that include transparent objects such as display screens and lenses respectively. Each layer of the system includes a transparent member, an adhesion system, and a removal system. The transparent member is shaped to two dimensionally conform or exceed the dimensions of an exposed outer surface of the transparent object. The adhesion system removably couples the transparent member to the transparent object in a manner that does not significantly affect the transparency of the combination. The removal system allows individual layers to be removed without substantially affecting the remaining layers or the transparency of the system. One particular removal system embodiment includes attaching an outer tab to each of the layers. Each tab may be uniquely positioned along the outer edge of each layer to allow a user to peel away one or more top layers without affecting the layers below. In addition, each tab may be uniquely colored and/or numerically labeled to indicate the sequence of layers. A second embodiment of the invention relates to a method for sequentially removing protective layers from a transparent object as each layer becomes damaged or otherwise less transparent.

20 Claims, 3 Drawing Sheets

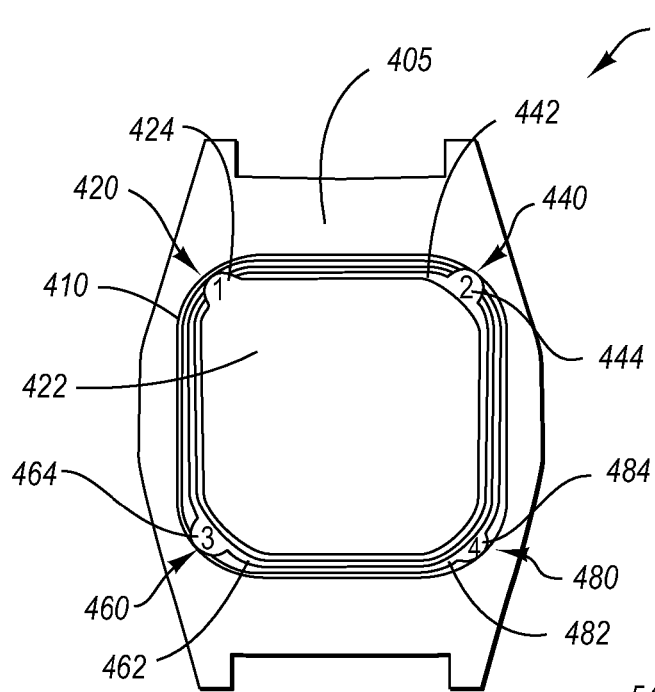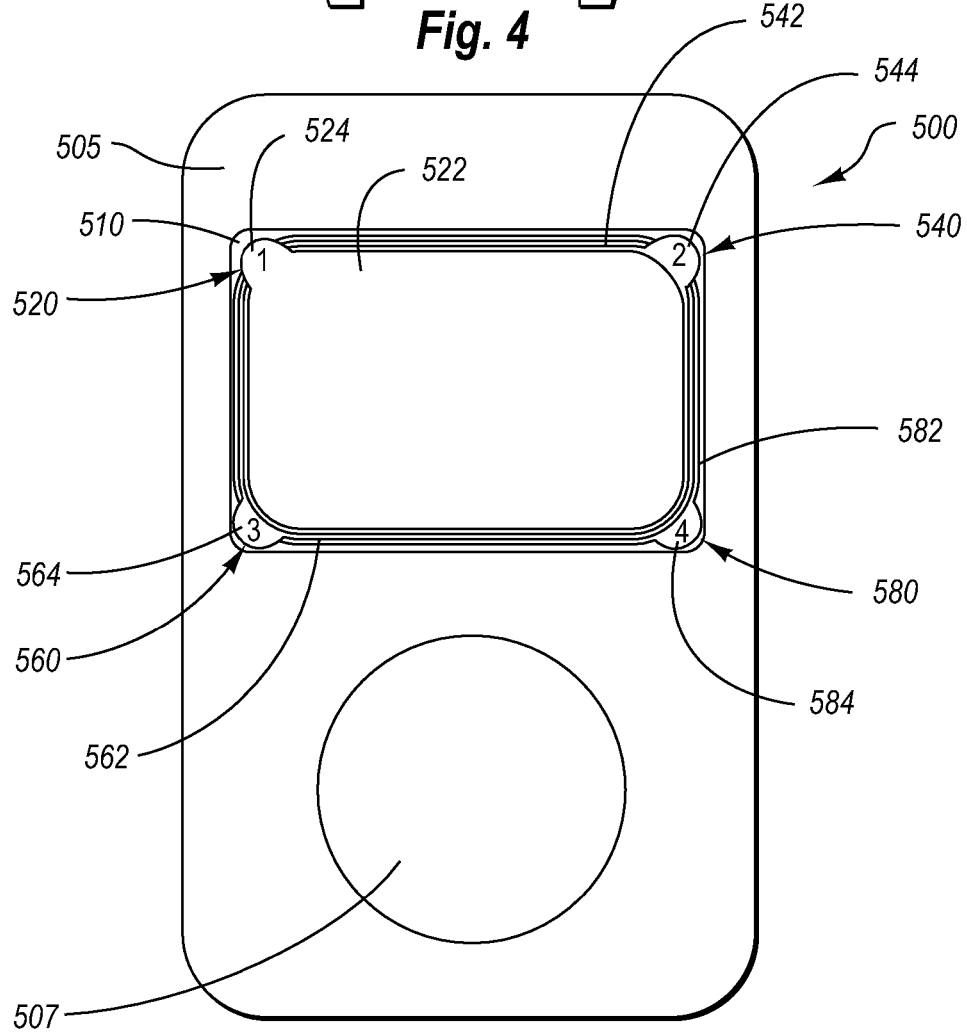

PROTECTIVE COVER SYSTEM

RELATED APPLICATIONS

This application claims priority to U.S. provisional application Ser. No. 60/677,868 filed May 5, 2005.

FIELD OF THE INVENTION

The invention generally relates to a protective cover system. In particular, the invention relates to systems and methods for protecting vulnerable transparent objects including electronic screens, laminated documents, and eyewear lenses.

BACKGROUND OF THE INVENTION

Electronic devices often include one or more display screens for conveying information to a user. These displays generally include a transparent glass or plastic plate for covering the electronic display components. The glass or plastic plate protects the electronics from dust and debris that may otherwise damage the device while allowing a user to still view the electronic display components. The glass or plastic plate is highly susceptible to scratches and cracks, which may interfere or prevent a user from viewing the electronic display components. Unfortunately, the glass or plastic plate cannot simply be removed or replaced without disassembling the entire device. Therefore, it is desirable to prevent or minimize any surface defects on the plate so as to maintain a user's ability to view the electronic display components.

Many electronic devices have recently been manufactured in a form factor that allows for portability. However, portable electronic devices are exposed to even more circumstances in which the display may be damaged, thereby affecting a user's ability to view the electronic components. For example, portable audio and video players include electronic component display screens which display various types of information, including audio information, date, time, video, etc. To prevent damage, many companies have created covers and sleeves designed to protect these devices from damage. However, certain functionalities of the devices are often inoperable when located in the protective sleeve. In addition, the protective sleeves increase weight and overall dimensions of the devices, thereby negatively affecting portability. Therefore, this solution does not adequately solve the problem of display damage to electronic devices.

In addition to electronics, other transparent objects and devices are susceptible to damage that may dramatically affect their usefulness. For example, various types of eyewear including corrective vision and sun protection glasses are both portable and require maximum transparency to maintain effectiveness. Due to their close proximity to a user's eye, small scratches and imperfections are easily noticeable and may affect the performance. As with electronic displays, the existing protection systems are focused on storing the eyewear in a protective case when not in use. These protective cases do not protect the eyewear during use or in transit to and from the case.

Accordingly, there is a need in the industry for a transparent object protection system that protects from scratching without dramatically affecting the operability of the object.

SUMMARY OF THE INVENTION

The present invention relates to a protective cover system. One embodiment of the present invention relates to a multi-layer protective cover system configured to be disposed over a transparent object. Particular embodiments relate to incorporating the system with electronic devices and articles of eyewear that include transparent objects such as display screens and lenses respectively. Each layer of the system includes a transparent member, an adhesion system, and a removal system. The transparent member is shaped to two dimensionally conform or exceed the dimensions of an exposed outer surface of the transparent object. The adhesion system removably couples the transparent member to the transparent object in a manner that does not significantly affect the transparency of the combination. The removal system allows individual layers to be removed without substantially affecting the remaining layers or the transparency of the system. One particular removal system embodiment includes attaching an outer tab to each of the layers. Each tab may be uniquely positioned along the outer edge of each layer to allow a user to peel away one or more top layers without affecting the layers below. In addition, each tab may be uniquely colored and/or numerically labeled to indicate the sequence of layers. A second embodiment of the invention relates to a method for sequentially removing protective layers from a transparent object as each layer becomes damaged or otherwise less transparent.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 4 illustrates a frontal view of a watch with a multi-layer protective cover system in accordance with a fourth embodiment of the present invention; and FIG. 5 illustrates a frontal view of a portable audio device with a multi-layer protective cover system in accordance with a fifth embodiment of the present invention.

DETAILED DESCRIPTION OF THE INVENTION

Figure 1:
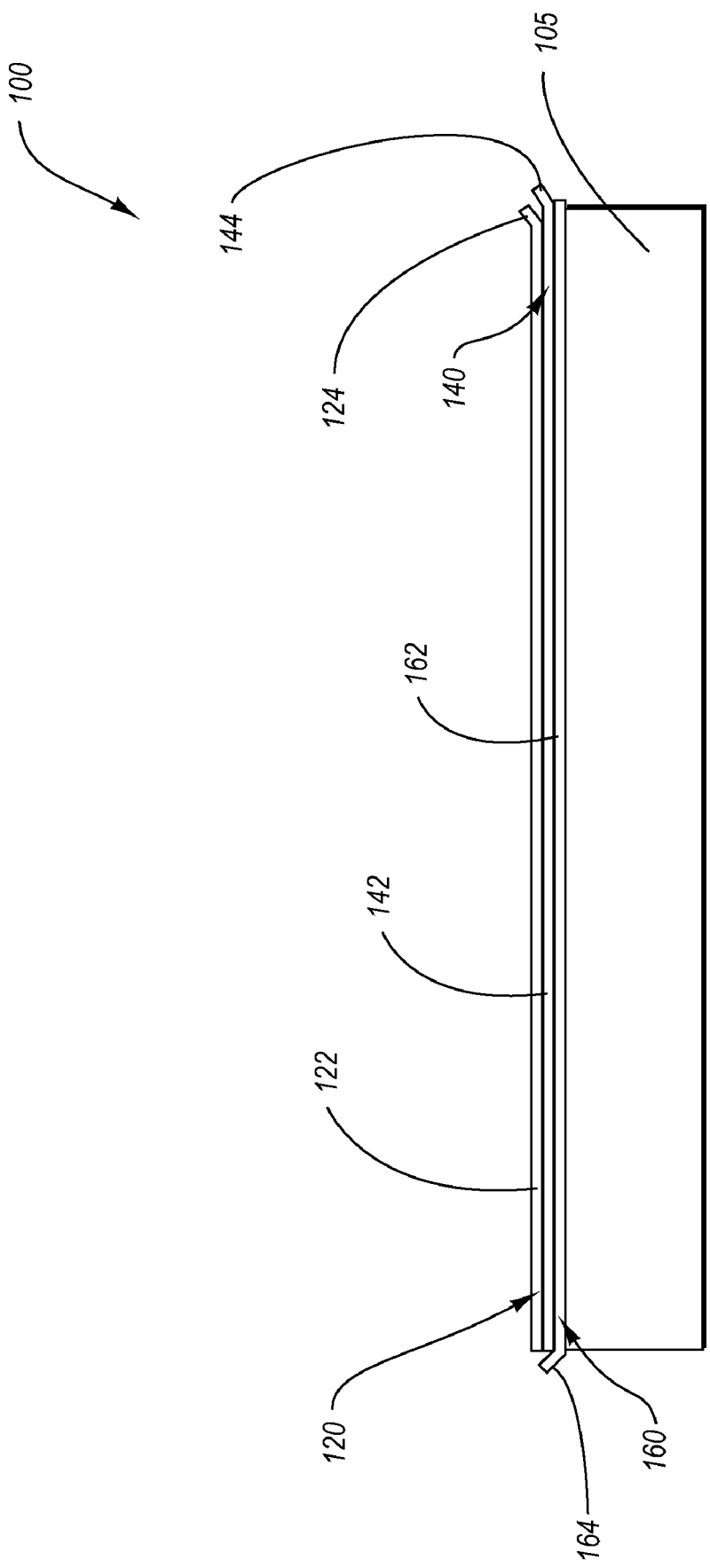
FIG. 1 illustrates a profile view of one embodiment of a multi-layer protective cover system in accordance with one embodiment of the present invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The present invention relates to a protective cover system. One embodiment of the present invention relates to a multi-layer protective cover system configured to be disposed over a transparent object. Particular embodiments relate to incorporating the system with electronic devices and articles of eyewear that include transparent objects such as display screens and lenses respectively. Each layer of the system includes a transparent member, an adhesion system, and a removal system. The transparent member is shaped to two dimensionally conform or exceed the dimensions of an exposed outer surface of the transparent object. The adhesion system removably couples the transparent member to the transparent object in a manner that does not significantly affect the transparency of the combination. The removal system allows individual layers to be removed without substantially affecting the remaining layers or the transparency of the system. One particular removal system embodiment includes attaching an outer tab to each of the layers. Each tab may be uniquely positioned along the outer edge of each layer to allow a user to peel away one or more top layers without affecting the layers below. In addition, each tab may be uniquely colored and/or numerically labeled to indicate the sequence of layers. A second embodiment of the invention relates to a method for sequentially removing protective layers from a transparent object as each layer becomes damaged or otherwise less transparent. While embodiments of the present invention are directed at a protective cover system, it will be appreciated that the teachings of the present invention are applicable to other fields.

The following terms are defined:

Transparent object—any object that allows for transparent viewing. For example, a display cover on an electronic device is a transparent object that allows for the electronic display to be transparently viewed. Likewise, the lens on an article of eyewear allows a user to maintain vision through the lens. Various other transparent objects may be utilized in accordance with the present invention.

Adhesion system—a system of adhering one objection to another including chemical, mechanical, magnetic, etc. For example, packing tape includes a chemical adhesion system that allows it to be coupled to any surface.

Removal system—a system that allows an item to be removed from at least one other item.

Stacked configuration—a plurality of items positioned on top of one another and substantially aligned with one another to maintain a particular two-dimensional space.

Reference is initially made to FIG. 1, which illustrates a profile view of a one embodiment of a multi-layer protective cover system in accordance with the present invention, designated generally at 100. The system includes a transparent object 105 and a plurality of layers 120, 140, 160. Each of the layers 120, 140, 160 further includes a transparent member 122, 142, 162 and a removal system 124, 144, 164, respectively. The illustrated transparent object 105 may be coupled to any device for transparently viewing including but not limited to an electronic device, an article of eyewear, a timing device, and an audio device. Particular applications of the illustrated embodiment will be described in more detail with reference to FIGS. 2-5. The transparent object is susceptible to damage, which reduces its transparency. For example, a transparent object composed of glass may be scratched or cracked in a manner that obstructs the ability of a user to transparently view through the transparent object. Various other conditions may exist, which cause the transparent object to reduce transparency including but not limited to heat exposure, surfacing staining, chemical deposits, etc.

The plurality of layers 120, 140, 160 are disposed on top of the transparent object 105 in a stacked configuration. Each of the layers 120, 140, 160 are two dimensionally shaped to conform or exceed the dimensions of the transparent object 105 in a particular plane. The particular plane is parallel to the surface of the transparent object 105; in the illustrated embodiment, this plane is horizontal. In addition, the configuration, orientation, and shape of the layers 120, 140, 160 with respect to the transparent object maintains the ability of a user to view the transparent object through the layers 120, 140, 160. The layers 120, 140, 160 are flexible such that they can bend and fold with respect to one another and with respect to the transparent object 105. Various well known transparent materials may be used that include flexible characteristics.

The plurality of layers 120, 140, 160 further include a transparent member 122, 142, 162, an adhesion system (not designated), and a removal system 124, 144, 164. The transparent members 122, 142, 162 are individual sheets of transparent material shaped, oriented, and positioned in accordance with the description above. The adhesion system on each layer removably couples the plurality of layers to one another and to the transparent object 105. The adhesion system maintains the ability to transparently view through the layers 120, 140, 160 and the transparent object 105. Various well known adhesion systems may be used, including chemical, mechanical, magnetic, etc. For example, a transparent chemical composition may be disposed on the illustrated bottom surface of each layer 120, 140, 160 such that it is removably coupled to the object directly below. The removal system 124, 144, 164 on each layer includes a distinctive removal system that allows a user to individually remove one layer while maintaining the ability to view through the layers 120, 140, 160 and the transparent object 105. In addition, the distinctive removal system allows for the layers to be sequentially identified for purposes of sequential removal. It is important for a user to be able to sequentially identify the layers 120, 140, 160 or identify the top layer 120 so as to be able to remove the top layer 120 from the remainder of the system 100 as it becomes damaged in some manner that reduces its individual transparency characteristics. In the illustrated embodiment, the removal systems 124, 144, 164, on each layer are unique protrusions which extend out from the horizontal side of the respective layers 120, 140, 160. The unique protrusions are independently two dimensionally positioned such that at least a portion of each unique protrusion is directly visible in the stacked layer configuration. This unique positioning will be illustrated in more detail with reference to FIGS. 2-5.

In operation, the system 100 maintains transparency by allowing a user to sequentially remove a top layer 120 as it becomes less transparent. The plurality of layers 120, 140, 160 may be predisposed or assembled on a transparent object coupled to a device or retrofitted to an existing transparent object to provide transparency protection. In order to protect the transparent object 105 from reduction of transparency, the plurality of layers 120, 140, 160 must be coupled to the transparent object 105 before it is damaged or exposed to transparency reducing actions. Once the plurality of layers 120, 140, 160 are properly coupled and aligned on the transparent object, it may be exposed to situations that may otherwise permanently reduce the transparency of the transparent object. For example, if an object contacts the transparent object 105 in a manner that would otherwise reduce transparency, the top layer 120 will receive the damage instead of the transparent object because of the positioning of the plurality of layers 120, 140, 160. A user then recognizes the damage sustained to the top layer and determines that the transparency has been reduced. The user then identifies the top layer 120 by identifying a distinctive protrusion that provides layer sequencing information relating to the top layer's 120 relative positioning in the stacked configuration. The user then removes the top layer 120 from the remainder of the system 100 using the removal system 124 while maintaining the transparency of the remainder of the system 100. By removing the top layer 120, full transparency is restored to the remainder of the system 100. Various numbers of layers may be utilized in accordance with the present invention so as to allow a user to make a respective number of layer removals to restore full transparency of the system.

Figure 2:
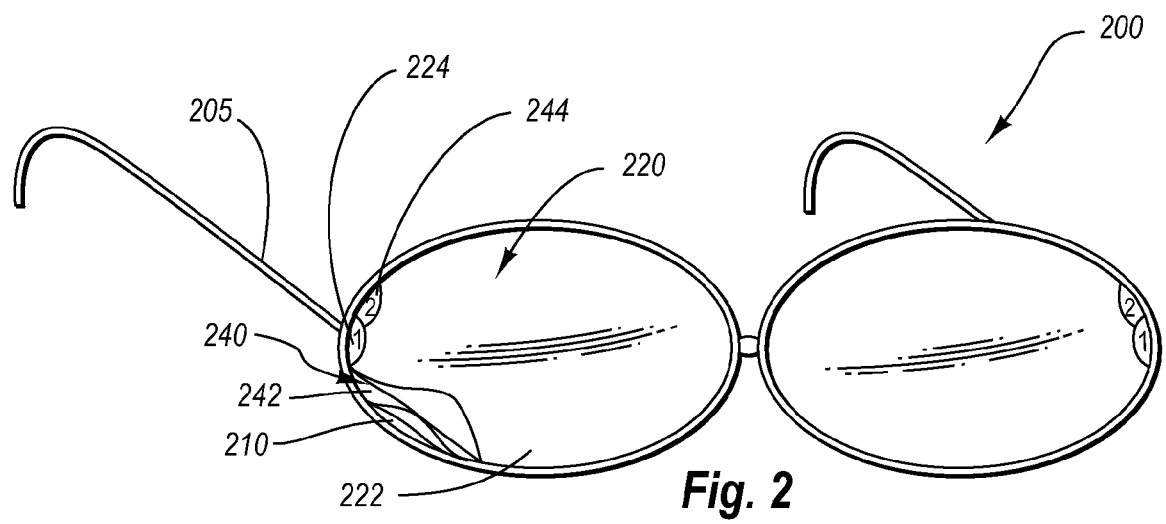
FIG. 2 illustrates a perspective view of an article of eyewear with a multi-layer protective cover system in accordance with a second embodiment of the present invention.

Reference is next made to FIG. 2, which illustrates a perspective view of an article of eyewear with a multi-layer protective cover system in accordance with a second embodiment of the present invention, designated generally at 200. The illustrated protective cover system embodiment 200 includes an article of eyewear that further includes a frame 105, and a pair of lenses 210. A plurality of layers 220, 240 are disposed on the front surface of each of the lenses 210 in the manner illustrated. Each of the layers 220, 240 further includes a transparent member 222, 242, an adhesion system (not designated), and a removal system 224, 244. The illustrated removal systems 224, 244 include tabs that independently extend away from the transparent members 222, 242 while maintaining the transparency of the system 200. It should also be noted that the illustrated removal systems 224, 244 include numbers corresponding to the relative positioning of the respective layer with respect to the remainder of the system 200. Other distinctive removal systems that convey sequencing information may also be utilized in accordance with the present invention. The layers 220, 240 designated on the left lens 210 are independent of the layers on the right lens and may therefore be utilized independently for purposes of transparency protection. The lenses 210 of articles of eyewear are commonly scratched or damaged in a manner that reduces transparency and therefore reduces their overall effectiveness. In the illustrated embodiment 200, forces or exposure that would otherwise damage the lens 210, damage the transparent member of the top layer 220 instead. The top layer 220 may then be removed to restore full transparency as described above utilizing the removal system 224. Since the layers on the two lenses 210 are independent, damage to the top layer 220 on the left lens 210 will not necessarily require that the top layer on the right lens be removed in order to restore full transparency. Although the illustrated system only contains two layers 220, 240 on each lens, other layers may be added in accordance with the present invention.

Figure 3:
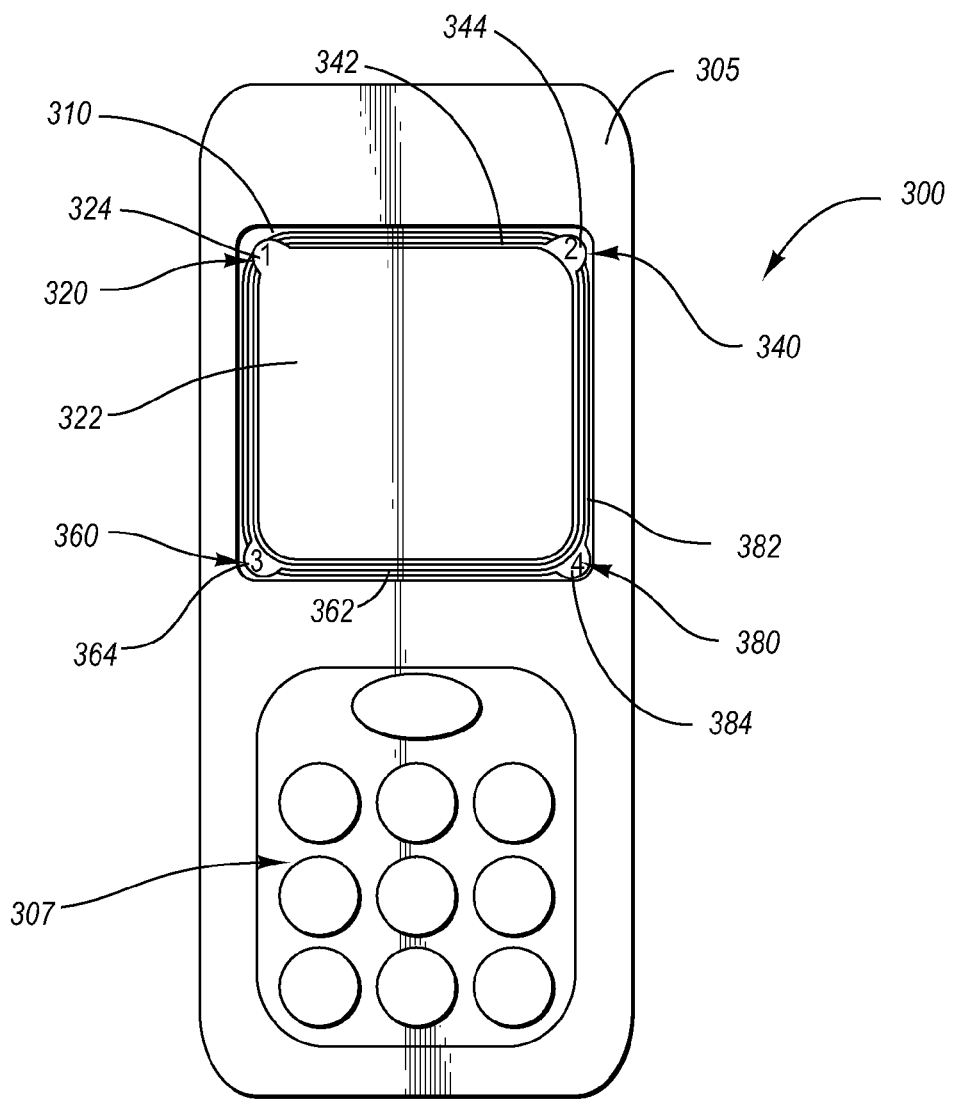
FIG. 3 illustrates a frontal view of a cell phone with a multi-layer protective cover system in accordance with a third embodiment of the present invention.

Reference is next made to FIG. 3, which illustrates a frontal view of a cell phone with a multi-layer protective cover system in accordance with a third embodiment of the present invention, designated generally at 300. The illustrated protective cover system embodiment 300 includes a cell phone 305 with a transparent display 310. The transparent display 310 allows a user to transparently view the electronic display and receive information from the cell phone 305. A plurality of layers 320, 340, 360, 380 are disposed on the transparent display 310 in the manner illustrated such that a user maintains the ability to receive information from the cell phone 305. Each of the layers 320, 340, 360, 380 further includes a transparent member 322, 342, 362, 382, an adhesion system (not designated), and a removal system 324, 344, 364, 384. The illustrated removal systems 324, 344, 364, 384 include tabs that independently extend away from the transparent members 322, 342, 362, 382 while maintaining the transparency of the system 300. It should also be noted that the illustrated removal systems 324, 344, 364, 384 include numbers corresponding to the relative positioning of the respective layer with respect to the remainder of the system 300. Other distinctive removal systems that convey sequencing information may also be utilized in accordance with the present invention. The transparent display 310 of electronic devices are commonly scratched or damaged in a manner that reduces transparency and therefore reduces their overall effectiveness. In the illustrated embodiment 300, forces or exposure that would otherwise damage the transparent display 310, damage the transparent member 322 of the top layer 320 instead. The top layer 320 may then be removed to restore full transparency as described above utilizing the removal system 324. Although the illustrated system only contains four layers 320, 340, 360, 380, other layers may be added or subtracted in accordance with the present invention.

Reference is next made to FIG. 4, which illustrates a frontal view of a watch with a multi-layer protective cover system in accordance with a fourth embodiment of the present invention, designated generally at 400. The illustrated protective cover system embodiment 400 includes a watch 405 with a transparent display 410. The transparent display 410 allows a user to transparently view the electronic display and/or receive timing information from the watch 405. A plurality of layers 420, 440, 460, 480 are disposed on the transparent display 410 in the manner illustrated such that a user maintains the ability to receive information from the watch 405. Each of the layers 420, 440, 460, 480 further includes a transparent member 422, 442, 462, 482, an adhesion system (not designated), and a removal system 424, 444, 464, 484. The illustrated removal systems 424, 444, 464, 484 include tabs that independently extend away from the transparent members 422, 442, 462, 482 while maintaining the transparency of the system 400. It should also be noted that the illustrated removal systems 424, 444, 464, 484 include numbers corresponding to the relative positioning of the respective layer with respect to the remainder of the system 400. Other distinctive removal systems that convey sequencing information may also be utilized in accordance with the present invention. The transparent display 410 of electronic and timing devices are commonly scratched or damaged in a manner that reduces transparency and therefore reduces their overall effectiveness. In the illustrated embodiment 400, forces or exposure that would otherwise damage the transparent display 410, damage the transparent member 422 of the top layer 420 instead. The top layer 420 may then be removed to restore full transparency as described above utilizing the removal system 424. Although the illustrated system only contains four layers 420, 440, 460, 480, other layers may be added or subtracted in accordance with the present invention.

Reference is next made to FIG. 5, which illustrates a frontal view of a portable audio device with a multi-layer protective cover system in accordance with a fifth embodiment of the present invention, designated generally at 500. The illustrated protective cover system embodiment 500 includes an audio device 505 with a transparent display 510. The audio device may be any audio, video, or storage device including but not limited to an Ipod. The transparent display 510 allows a user to transparently view the electronic display and/or receive information from the audio device 505. A plurality of layers 520, 540, 560, 580 are disposed on the transparent display 510 in the manner illustrated such that a user maintains the ability to receive information from the audio device 505. Each of the layers 520, 540, 560, 580 further includes a transparent member 522, 542, 562, 582, an adhesion system (not designated), and a removal system 524, 544, 564, 584. The illustrated removal systems 524, 544, 564, 584 include tabs that independently extend away from the transparent members 522, 542, 562, 582 while maintaining the transparency of the system 500. It should also be noted that the illustrated removal systems 524, 544, 564, 584 include numbers corresponding to the relative positioning of the respective layer with respect to the remainder of the system 500. Other distinctive removal systems that convey sequencing information may also be utilized in accordance with the present invention. The transparent display 510 of electronic and audio devices are commonly scratched or damaged in a manner that reduces transparency and therefore reduces their overall effectiveness. In the illustrated embodiment 500, forces or exposure that would otherwise damage the transparent display 510, damage the transparent member 522 of the top layer 520 instead. The top layer 520 may then be removed to restore full transparency as described above utilizing the removal system 524. Although the illustrated system only contains four layers 520, 540, 560, 580, other layers may be added or subtracted in accordance with the present invention.

Thus, as discussed herein, the embodiments of the present invention relate to a protective cover system. The present invention may be embodied in other specific forms without departing from its spirit or essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A multi-layer protective cover system configured to cover a transparent object comprising:
    a plurality of layers wherein each layer comprises:
        a transparent member, wherein the transparent member is flexible;
        an adhesion system configured to removably couple the transparent member to at least one of the transparent object and an independent one of the plurality of layers in a manner that substantially maintains the transparency of the transparent flexible member and the transparent object; and
        a removal system disposed entirely on the transparent member and over the transparent object, wherein the removal system allows the plurality of layers to be sequentially identified for purposes of sequential removal, and wherein the removal system substantially maintains the ability to view through the transparent object and the plurality of layers.

2. The system of claim 1, wherein the plurality of layers are stacked on top of one another and removably coupled to one another in a stacked configuration.

3. The system of claim 1, wherein the transparent member is shaped to at least conform to a two dimensional shape of an exposed outer surface of the transparent object.

4. The system of claim 1, wherein the transparent object is coupled to an electronic device and wherein a display is viewable on the electronic device through the transparent object.

5. The system of claim 1, wherein the transparent object is coupled to an article of eyewear and wherein the transparent object is a lens of the article of eyewear.

6. The system of claim 1, wherein the transparent object is coupled to a timing device and wherein a timing display is viewable on the timing device through the transparent object.

7. The system of claim 1, wherein the transparent object is susceptible to damage that reduces the transparency of the transparent object.

8. The system of claim 1, wherein the removal system is a distinctive protrusion.

9. The system of claim 1, wherein the removal system is a protrusion, and wherein the protrusion on each layer is positioned independently such that each protrusion can be independently identified if the plurality of layers are stacked on top of one another.

10. The system of claim 1, wherein the removal system on each layer includes visual sequencing information relating to the relative positioning of each layer with respect to the remaining layers.

11. The system of claim 10, wherein the visual sequencing information includes a number indicating the position of each layer with respect to the remaining layers.

12. A multi-layer protective cover system comprising:
    a plurality of layers stacked on top of one another and removably coupled to one another in a stacked configuration, and wherein the plurality of layers are removably coupled to a transparent object via a removable coupling between one of the plurality of layers and the transparent object, wherein each layer comprises:
        a transparent member, wherein the transparent member is flexible, and wherein the transparent member is shaped to conform to a two dimensional shape of an exposed outer surface of the transparent object, wherein the transparent object is coupled to at least one of an electronic device, an article of eyewear, and a timing device;
        an adhesion system configured to removably couple the transparent member to at least one of the transparent object and an independent one of the plurality of layers in a manner that substantially maintains the transparency of the transparent flexible member and the transparent object; and
        a removal system disposed entirely on the transparent member and over the transparent object, wherein the removal system allows the plurality of layers to be sequentially identified for purposes of sequential removal, and wherein the removal system substantially maintains the ability to view through the transparent object and the plurality of layers.

13. The system of claim 12, wherein the transparent member includes a plastic composite.

14. The system of claim 12, wherein the removal system includes a distinctive protrusion.

15. The system of claim 12, wherein the removal system is a protrusion, and wherein the protrusion on each layer is positioned independently such that each protrusion can be independently identified if the plurality of layers are stacked on top of one another.

16. The system of claim 12, wherein the removal system on each layer includes visual sequencing information relating to the relative positioning of each layer with respect to the remaining layers.

17. The system of claim 16, wherein the visual sequencing information includes a number indicating the position of each layer with respect to the remaining layers.

18. A method for sequentially removing protective layers from a transparent object as each layer becomes damaged or otherwise less transparent, comprising the acts of:
    providing a multi-layer protective cover system configured to cover a transparent object comprising:

a plurality of layers wherein each layer comprises:

a transparent member, wherein the transparent member is flexible;

an adhesion system configured to removably couple the transparent member to at least one of the transparent object and an independent one of the plurality of layers in a manner that substantially maintains the transparency of the transparent flexible member and the transparent object;

a removal system disposed entirely on the transparent member and over the transparent object, wherein the removal system allows the plurality of layers to be sequentially identified for purposes of sequential removal, and wherein the removal system substantially maintains the ability to view through the transparent object and the plurality of layers;

identifying a top layer of the multi-layer protective cover system by identifying a protrusion on the top layer that provides visual sequencing information while substantially maintaining the ability to view the transparent object through the multi-layer protective cover system; and removing the top layer from the of the multi-layer protective cover system and the transparent object while maintaining the coupling between the remaining layers of the protective cover system and the transparent object, and while maintaining the ability to view the transparent object through the remaining layers of the multi-layer protective cover system.

19. The method of claim 18, wherein the act of removing the top layer of the multi-layer protective cover system includes clasping the protrusion and extending the protrusion away from the remaining layers of the multi-layer protective cover system.

20. The method of claim 18, wherein the act of identifying a top layer of the multi-layer protective cover system includes identifying a number on the protrusion that indicates the relative positioning of the top layer with respect to the remaining layers of the multi-layer protective cover system.

* * * * *